(No Model.)  2 Sheets—Sheet 1.

D. C. MATTESON.
COMBINED HARVESTER AND THRASHER.

No. 383,233.  Patented May 22, 1888.

Witnesses,
Geo. H. Strong.
J. H. Towne.

Inventor,
D. C. Matteson.
By Dewey & Co.
attys (No Model.)  2 Sheets—Sheet 2.

D. C. MATTESON.
COMBINED HARVESTER AND THRASHER.

No. 383,233. Patented May 22, 1888.

Witnesses,
Geo. H. Strong.
J. H. Nurse.

Inventor,
D. C. Matteson.
By Dewey & Co.
atty

UNITED STATES PATENT OFFICE.

DON C. MATTESON, OF STOCKTON, CALIFORNIA.

COMBINED HARVESTER AND THRASHER.

SPECIFICATION forming part of Letters Patent No. 383,233, dated May 22, 1888.

Application filed October 5, 1887. Serial No. 251,563. (No model.)

*To all whom it may concern:*

Be it known that I, DON C. MATTESON, of Stockton, San Joaquin county, State of California, have invented an Improvement in Combined Harvesters and Thrashers; and I hereby declare the following to be a full, clear, and exact description of the same.

My invention relates to certain improvements in combined harvesters and thrashers; and it consists in certain details of construction, all of which will be more fully explained by reference to the accompanying drawings, in which—

Figure 1:
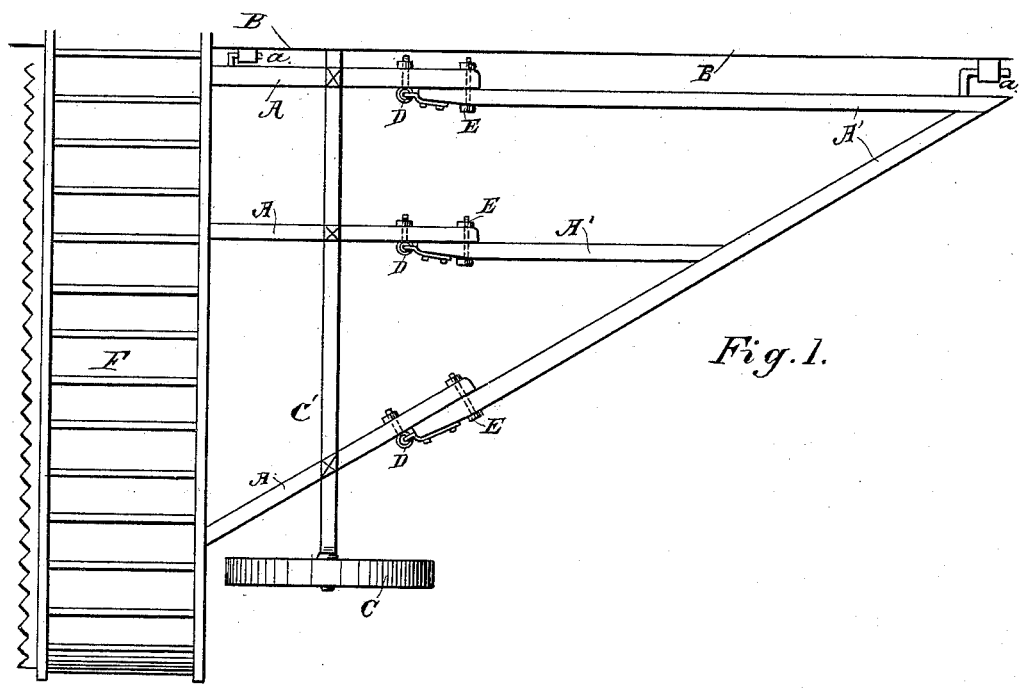
Figure 2:
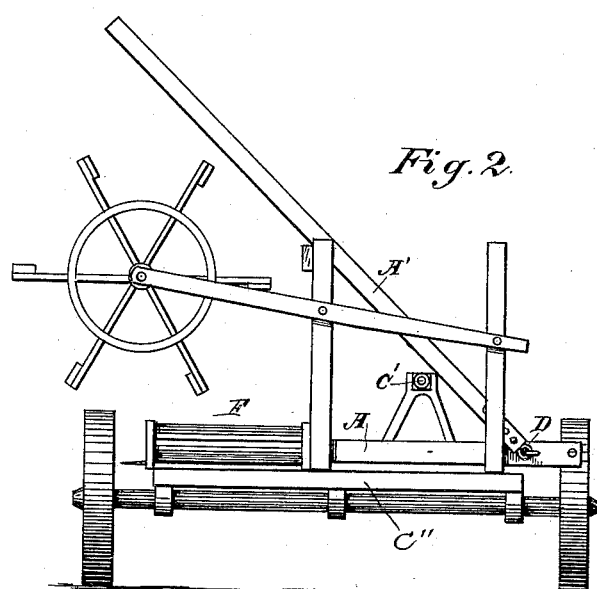
Figure 3:
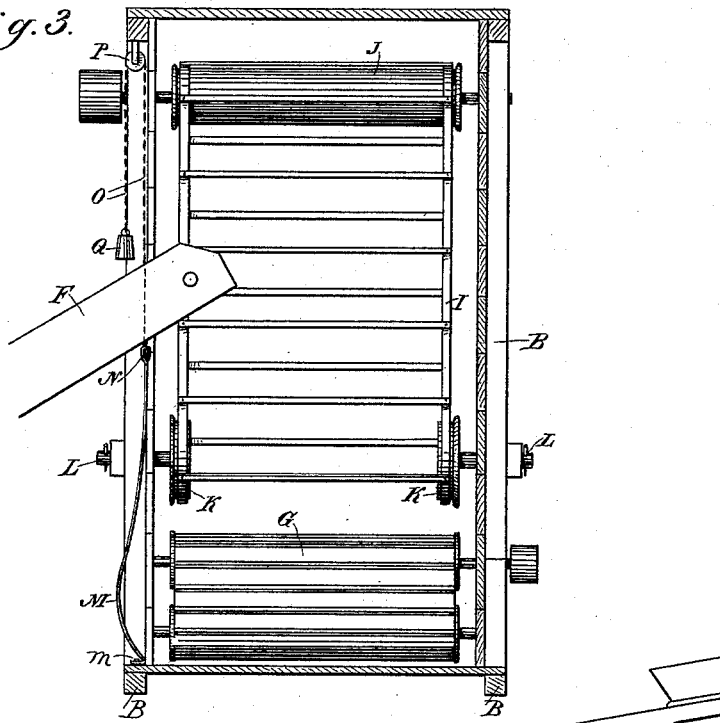
Figure 4:
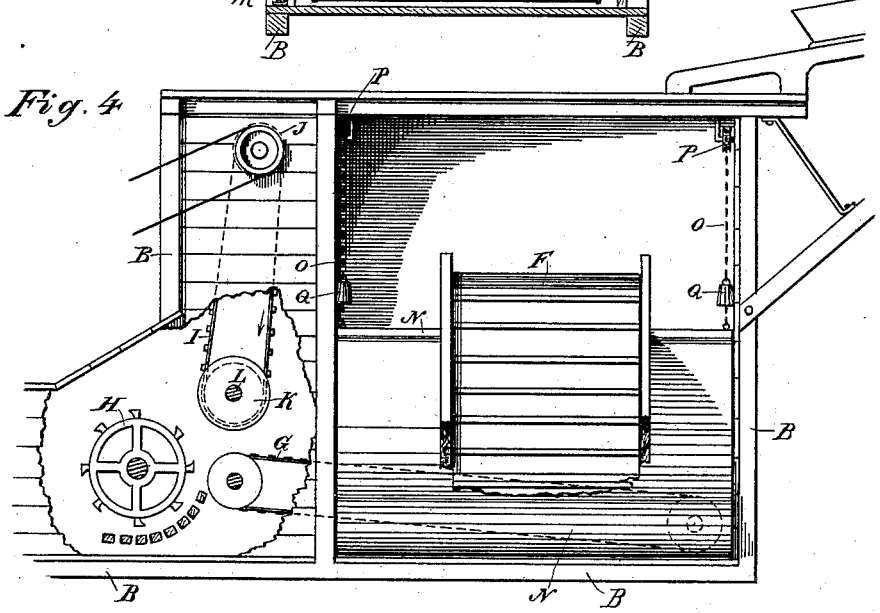

Figure 1 is a plan of the header-frame. Fig. 2 is a side view of the same, showing the rear hinged portion thrown forward. Fig. 3 is a cross-section through the feeding part of the thrasher. Fig. 4 is a side view of the same.

A A' indicate the frame of the header portion of a traveling harvester and thrasher, and B is the thrashing-machine portion.

The header-frame is hinged at *a* to the side of the thrashing-frame, so as to be removable therefrom in the usual manner when it is desired to transport the machine or to pass through narrow gates or openings, where it would be impossible to transport the machine as a whole. When this is done, the wheel C, which is mounted upon the axle C' and is at the outside of the header-frame, is removed, and a pair of wheels or a truck, C'', is placed beneath the header-frame, so that it may be thus drawn in a direction at right angles with the usual mode of progression, as shown in Fig. 2. The rear portion, A', of this frame, which extends back, is hinged to the front portion, A, as shown at D, and the overlapping timbers are bolted together by bolts at E, so that when in use the frame is perfectly rigid. When it is desired to transport this header-frame, it is separated from the thrasher, as before described, and the fastening-bolts E being removed from the overlapping timbers of the frame A and A', the rear portion, A', may be turned up, as shown in Fig. 2, so as to extend above the portion A, and the frame is thus very much shortened from the sickle bar toward the rear. As the supplemental wheels upon which this portion is transported when separated from the thrasher stand at right angles with its usual direction of motion, it will be seen that it will travel in a line parallel with the sickle, and the folded-over portion will thus narrow the machine so considerably that it may pass through gates which are of any of the usual dimensions. When the machine is in operation, the cut straw and grain pass up the header-spout, being conveyed by the belt F and delivered upon the horizontal feeder-belt G, by which it is conveyed and fed to the thrashing-cylinder H. In order to carry down any masses of straw which accumulate upon this belt and which are not properly fed forward, I employ a vertically-traveling belt, I, passing over a drum, J, at the top, through which power is transmitted to drive the belt, and over short drums or pulleys K at the lower end, which are also larger in diameter than the upper driving-drum, J.

In order to prevent a considerable loss of grain at the point where the spout of the belt F from the header discharges upon the feeder-belt G, I employ a flexible gate or apron, M, which is mounted in the side of the thrasher-frame, and which extends beneath the discharge end of the header-spout, having its lower edge secured to the frame of the thrasher at *m* and the upper edge to a bar, N, which keeps it extended. To each end of the bar N a cord, O, is attached and extends upward over a pulley, P, at the top of the frame B, said cords having their free ends attached to weights Q, adapted to keep the flexible gate or apron extended.

The gate is made flexible, so that as the discharge end of the header-spout rises or falls this gate will follow it to a certain extent, allowing the header-spout to descend to very near the bottom by simply folding or moving out of the way as the spout descends, and then following the spout up by reason of the counter-weights Q until it reaches a certain height, which is equal to its own vertical width.

If the header-spout rises above the height just mentioned, it will rise above the upper edge of the movable gate; but the latter will be sufficiently high to prevent any loss from the header-spout, although the latter may be raised to a considerable height above its upper edge.

Having thus described my invention, what I claim as new, and desire to secure by Letters Patent, is—

1. In a combined header and thrasher, a header-frame detachably hinged to the side of the thrasher, said header-frame composed of two parts, the rear portion being hinged to the front portion, so that it may be folded upon and above the forward portion to permit the header when detached to be drawn endwise through gates, substantially as herein described.

2. In a combined header and thrasher, a header-frame detachably hinged to the side of the thrasher, said header-frame composed of two parts, the bolts E uniting said parts, whereby they may be rigidly secured together or made separable, and a hinged connection at the rear of the front part of the header-frame, whereby the rear part of said frame may be folded upon and above the forward part, to permit the header when detached to be drawn endwise through gates, substantially as described.

3. In a combined harvester and thrasher, the combination of the thrashing-cylinder, the feeder-belt mounted in the thrasher, the header-belt F on the header-frame and projecting into the thrasher-frame, by which the straw is carried to the thrashing-machine, and the vertically-moving gate M, mounted in the side of the thrasher-frame and the counterbalance weights and cords, substantially as described.

4. In a combined harvester and thrasher, the combination of the thrashing-cylinder, the feeder-belt mounted in the thrasher, the header-belt F on the header-frame and projecting into the thrasher-frame, by which the straw is carried to the thrashing-machine, the vertically-moving flexible gate or apron M, mounted in the side of the thrasher-frame and extending beneath the discharge end of the header-spout, the cords connected with said gate, guide-pulleys for said cords, and the counterbalance-weights Q, attached to said cords, substantially as described.

In witness whereof I have hereunto set my hand.

DON C. MATTESON.

Witnesses:
J. D. HUFFMAN,
SAMUEL BLAIR.